United States Patent [19]

Ward

[11] Patent Number: 4,935,598

[45] Date of Patent: Jun. 19, 1990

[54] AUTOMATIC ARC WELDING WITH FILLER WIRE

[75] Inventor: Thomas A. Ward, Holts Summit, Mo.

[73] Assignee: ABB Power T&D Company Inc., Blue Bell, Pa.

[21] Appl. No.: 270,862

[22] Filed: Nov. 14, 1988

[51] Int. Cl.$^5$ .............................................. B23K 9/12
[52] U.S. Cl. ............................. 219/137.2; 219/125.1; 219/136
[58] Field of Search ................... 219/74, 124.34, 137.2, 219/136, 125.1

[56] References Cited

U.S. PATENT DOCUMENTS 4,249,062 2/1981 Hozumi et al. ................. 219/124.34

FOREIGN PATENT DOCUMENTS 58-13474 1/1983 Japan ...................................... 219/74

Primary Examiner—Clifford C. Shaw

[57] ABSTRACT

Automatic metal inert-gas-shielded arc welding of such apparatus as large transformer casings with stainless steel welding filler wire fed to the work through a torch from a spool. A series of seam welds are produced on each casing. The torch and spool are mounted on a movable arm of an electrically operated robot. The robot has sensing means responsive to electrical conduction through the work and the wire to position the wire in the correct location for producing each weld. The tip of the wire is oxidized during each weld of the series precluding the electrical conduction necessary to locate the wire for the next weld of the series. In accordance with the disclosure, there is provided a wire cutter displaced from work. After each weld, the robot arm positions the wire in the cutter. This positioning of the wire automatically triggers a proximity switch which actuates a high speed rotary grinder to sever the oxidized tip of the wire. The grinder moves at right angles to the wire cutting the wire squarely so that there is no bend in the resulting end of the wire to militate against accurate location by the sensor for the next weld. The grinder is composed of electrically insulating material and is mounted on an insulated fixture so that it does not shut off the robot by grounding.

14 Claims, 5 Drawing Sheets

AUTOMATIC ARC WELDING WITH FILLER WIRE

BACKGROUND OF THE INVENTION

This invention relates to welding and it has particular relationship to automatic welding operations in which a work-piece is welded by a series of filler welds carried out automatically in succession. Typical of such automatic welding operations is the welding of casings or cans for large transformers in which successive seam arc welds are produced at the intersections of wall sections at right angles to each other. This application, to an extent, is addressed to the welding of transformer casings in the interest of dealing with concrete practices for the purpose of facilitating the understanding of this invention. It is not intended that the scope of this invention should be limited to such practice. Any use of the principles of this invention is understood to be within the scope of equivalents of any patent which may issue on, or a result of, this application.

The automatic welding of the transformer casings is carried out by arc welding with a stainless steel filler wire which is fed from a spool through a torch to the joint to be welded. The spool and torch are mounted on the movable arm of an electrically controlled and operated robot which manipulates the torch and wire as necessary and controls their operation. Successive seam welds are produced at the joints between wall sections. After the welding of a joint is completed, the casing is rotated automatically and the wire is automatically positioned to weld the succeeding joint, the welding arc is fired and the seam is welded. To position the wire precisely at the joint to be welded, the robot includes a sensor which responds to the electrical conduction between the wire and the work to control the movable arm to position the tip of the filler wire appropriately at the joint. Specifically, an auxiliary potential is impressed between the wire and the work and the sensor senses the resulting current and properly positions the wire at the joint to be welded. It has been found that during the individual welds of a series, the tip of the wire becomes oxidized, increasing the electrical resistance between the wire and the work so that effective electrical conduction between the wire and the work for sensing is precluded. Prior to this invention, it was necessary for the operator to interrupt the automatic operation after a seam was welded and to cut the wire at the oxidized tip. A mechanical shear was provided for this purpose. It was found that this shear became dull after a few operations. In addition, because the shear is an electrical conductor not electrically insulated from the robot, and is grounded, it was necessary to disable the "nozzle touch" safety feature of the robot during the cutting operation. The "nozzle touch" is a protective circuit on the robot that automatically shuts the robot off if the welding nozzle or other part is grounded, i.e., if the nozzle or part strikes a fixture or other grounded structure. In addition, the wire was not cut squarely near the oxidized end so that the new end of the wire was curved instead of being linear and precise positioning of the wire at the joint was not feasible.

It is an object of this invention to overcome the drawbacks and deficiencies of prior practice and the prior art and to provide apparatus and a method for producing a series of welds in work automatically without interruption for manual severing after each weld of the series at the oxidized tip of the filler wire and without disabling the nozzle touch because of grounding. It is also an object of this invention to provide apparatus and a method for automatically severing the oxidized tip of the filler wire in whose use and practice the new tip of the wire, after severing, shall remain linear at its end.

SUMMARY OF THE INVENTION

In the practice of this invention, a series of welds to complete the welding of a work piece such as a transformer casing is carried out automatically without interruption because of oxidation of the filler wire, notwithstanding the presence of the shielding inert gas. An important feature of this invention is a means or mechanism which operates automatically and without disabling the "nozzle touch" to sever the filler wire near the oxidized tip after each weld of a series. The severing means includes a rotary grinder which operates at a high speed. Typically, the grinder is a wheel, having a diameter of about 3 inches and operating at 12,000 revolutions per minute, composed of resin-bonded fiberglass, an electrical insulator. A typical grinder is sold under the trademark Type 1 Resinforced by Pacific, Inc. The severing means is spaced from the work. On the completion of each weld of the series, the robot is commanded by an appropriately programmed computer to move the arm carrying the wire and torch to the severing means. The severing means is set into operation by a proximity switch which is triggered responsive to the disposition of the wire in position to be severed. On the triggering of the proximity switch, the rotation of the grinder is enabled and the grinder is swept through the wire near its oxidized tip severing the tip. Another important feature of this invention is that the grinder is swept through the wire substantially at right angles to the wire and at a high rate so that a square cut of the wire is produced and inaccurate sensing for the succeeding weld is precluded. Typically, the grinder moves through the wire at the rate of about 8 inches per minute. Since the grinder is composed of electrically insulating material and is mounted on a block of insulating material, it is not necessary to disable the "nozzle touch" during the severing operation.

BRIEF DESCRIPTION OF THE DRAWINGS

For a better understanding of this invention, both as to its organization and as to its method of operation, together with additional objects and advantages thereof, reference is made to the following description, taken in connection with the accompanying drawings, in which.

DETAILED DESCRIPTION OF EMBODIMENT

Figure 1:
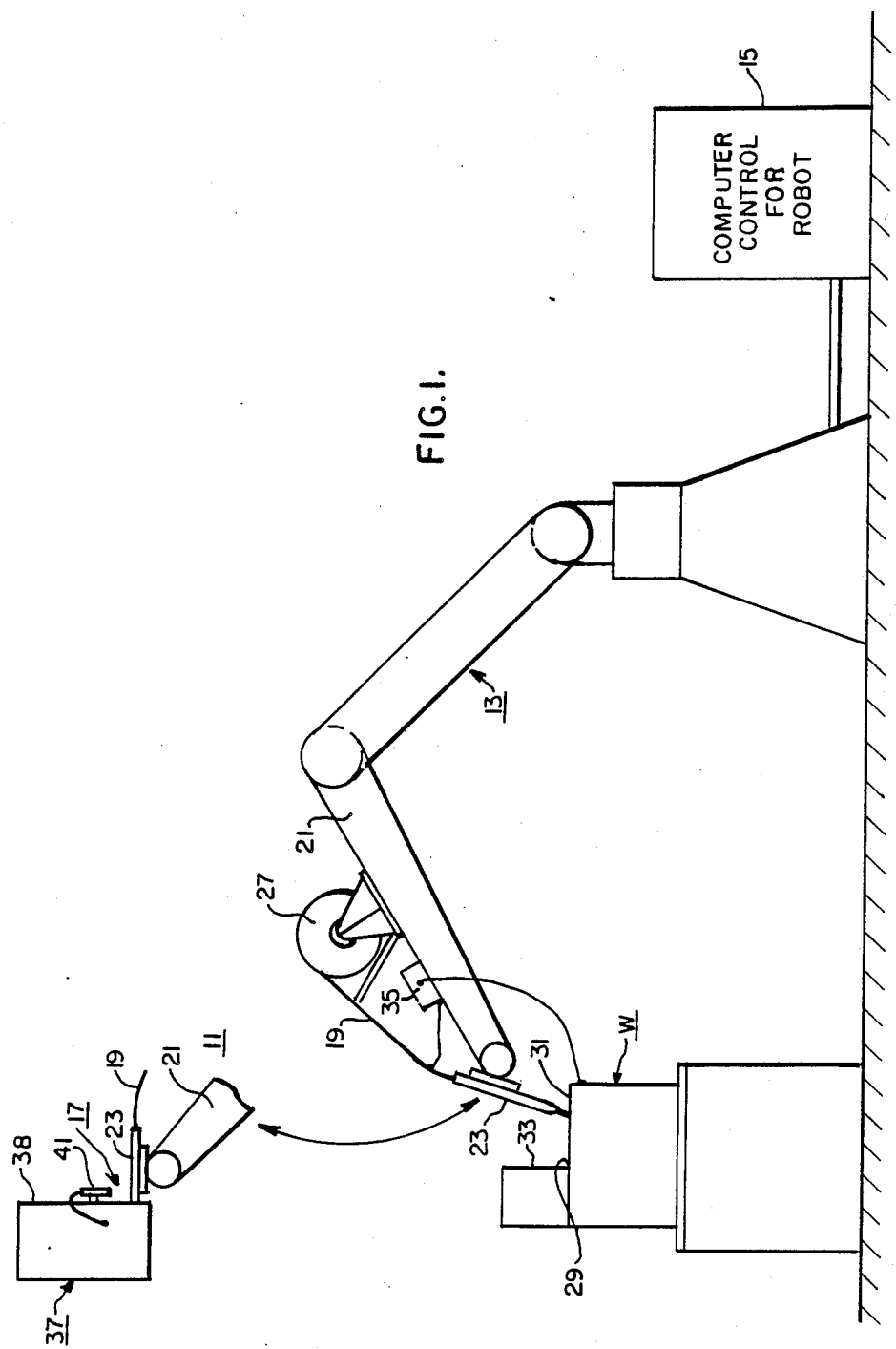
FIG. 1 is a diagrammatic view in side elevation showing automatic welding apparatus constituting an embodiment of this invention with which the method of this invention is practiced.
Figure 2:
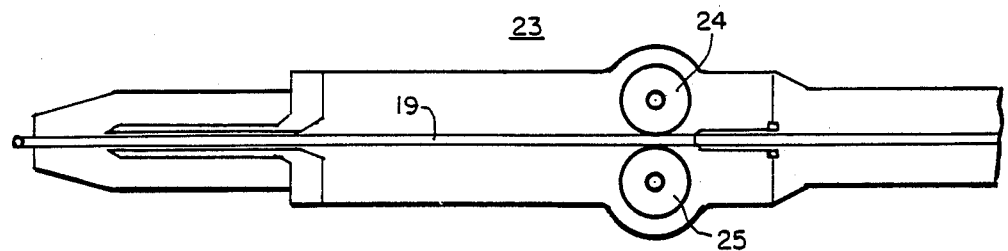
FIG. 2 is a diagrammatic view in side elevation of a welding torch included in the embodiment shown in FIG. 1.

The apparatus shown in the drawings is an automatic welding system 11 of the metal inert-gas-shielded type for welding work W. The system 11 includes a robot 13, a computer 15 programmed to control the operation of the system and severing means 17 for severing the oxidized ends 18 (FIG. 4) of filler wire 19. The robot 13 includes a movable arm 21 whose movement is controlled by computer 15. The arm 21 carries a welding torch 23 through which the filler wire 19 is fed by a drive roll 24 (FIG. 2) and an idler roll 25 from a spool 27.

Typically, a series of seam welds are to be produced along the joints 29 between wall sections 31 and 33 of the work W at right angles to each other. The work includes a plurality of such joints 29 and the welding of all joints is carried out automatically, the work being set with the joints positioned for welding in succession. This setting is controlled by computer 15. The filler wire 19 is set precisely with its tip in welding relationship with the work in response to sensing means 35 which senses when the tip of the wire is at the joint 29 and signals the computer 15 to command the welding operation. For this purpose, an auxiliary potential, typically 400 volts, is impressed between the wire 19 and the work W and the proper positioning is determined by measuring the resulting current. When the electrode 19 is oxidized at the tip 18, the flow of current for effective positioning of the wire is prevented.

Figure 3:
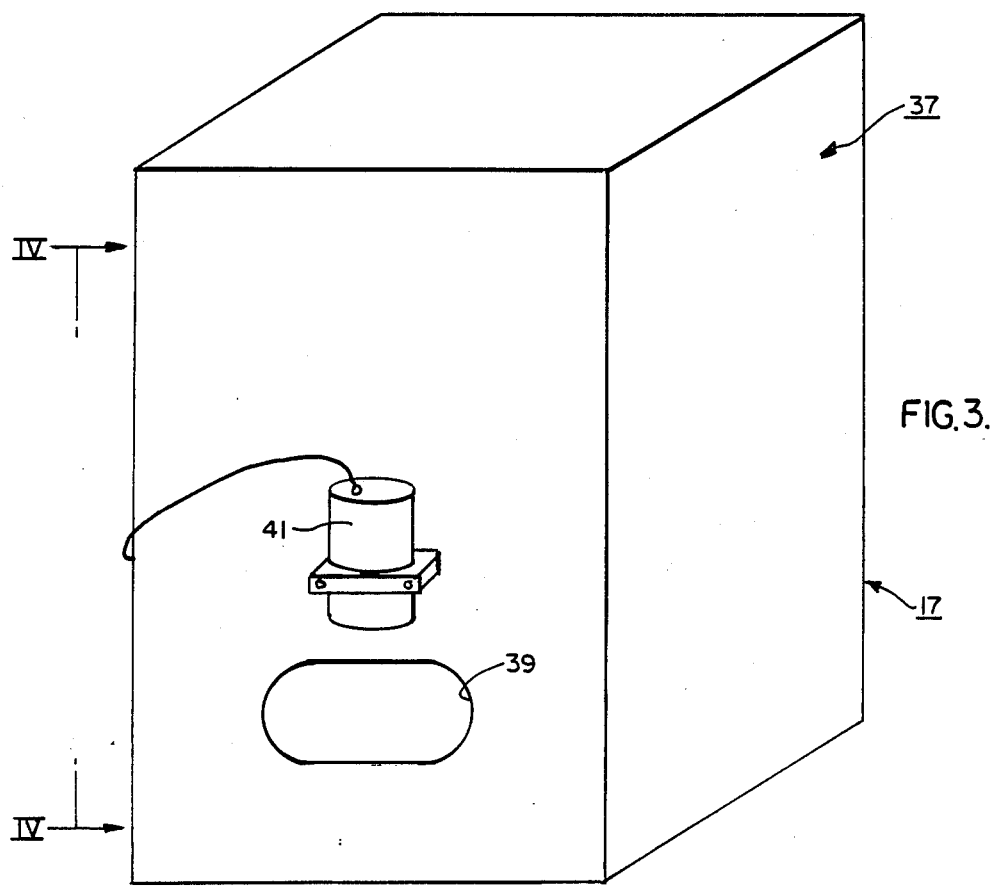
FIG. 3 is a diagrammatic view in isometric showing the enclosure for the severing means of the embodiment shown in FIG. 1.

The severing means includes an enclosure 37 in whose front wall 38 there is an opening 39 for receiving the torch 23. Above the opening 39, a proximity switch 41 (FIGS. 3, 4) is mounted. This switch 41 is spaced from the opening 39 so that it is in inductive relationship with the torch 23 and is triggered when the torch is injected into the opening 39. The switch 41 is normally open and it closes when triggered. The contacts 43 of the switch 41 are connected in circuit with a fluid-control valve 45 (FIG. 5), typically an air control valve. The valve 45 controls the flow of air from a source (not shown). Typically, the pressure of the inflowing air is 90 pounds per square inch guage.

Figure 4:
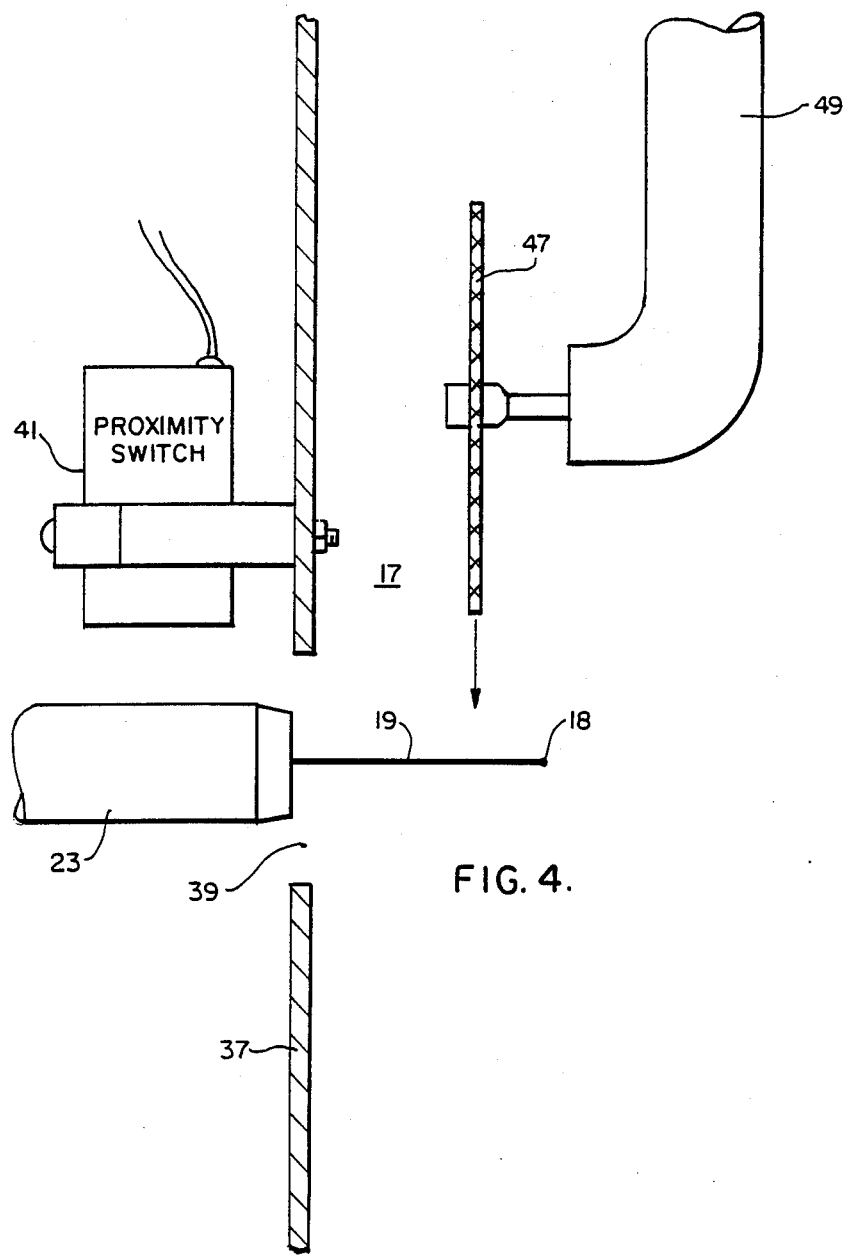
FIG. 4 is a fragmental diagrammatic view in section taken along line IV—IV of FIG. 3 showing the operation of the severing means.
Figure 5:
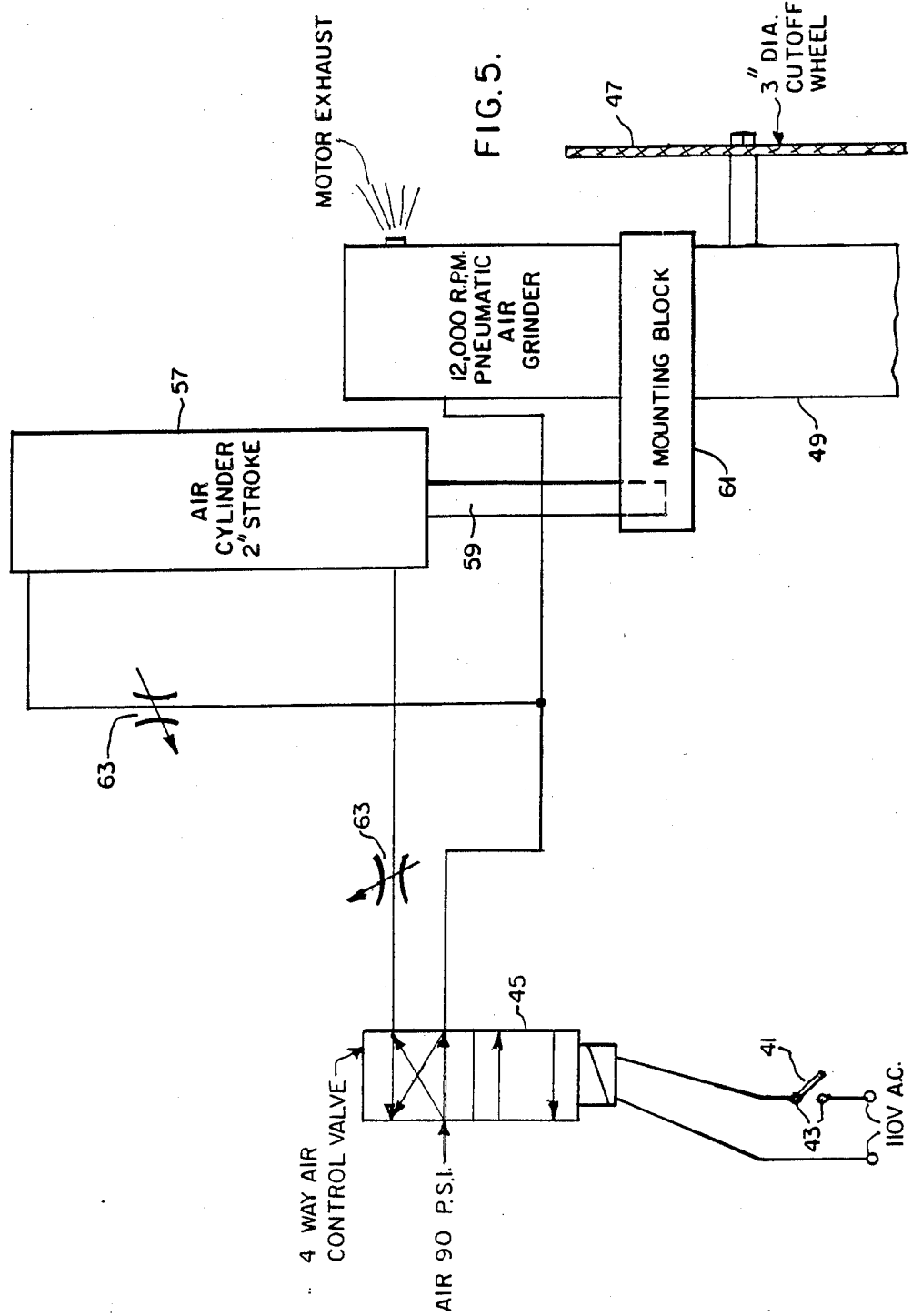
FIG. 5 is a diagrammatic view showing the electrical and fluid circuits which produce the operation of the severing means in the practice of this invention.
Figure 6:
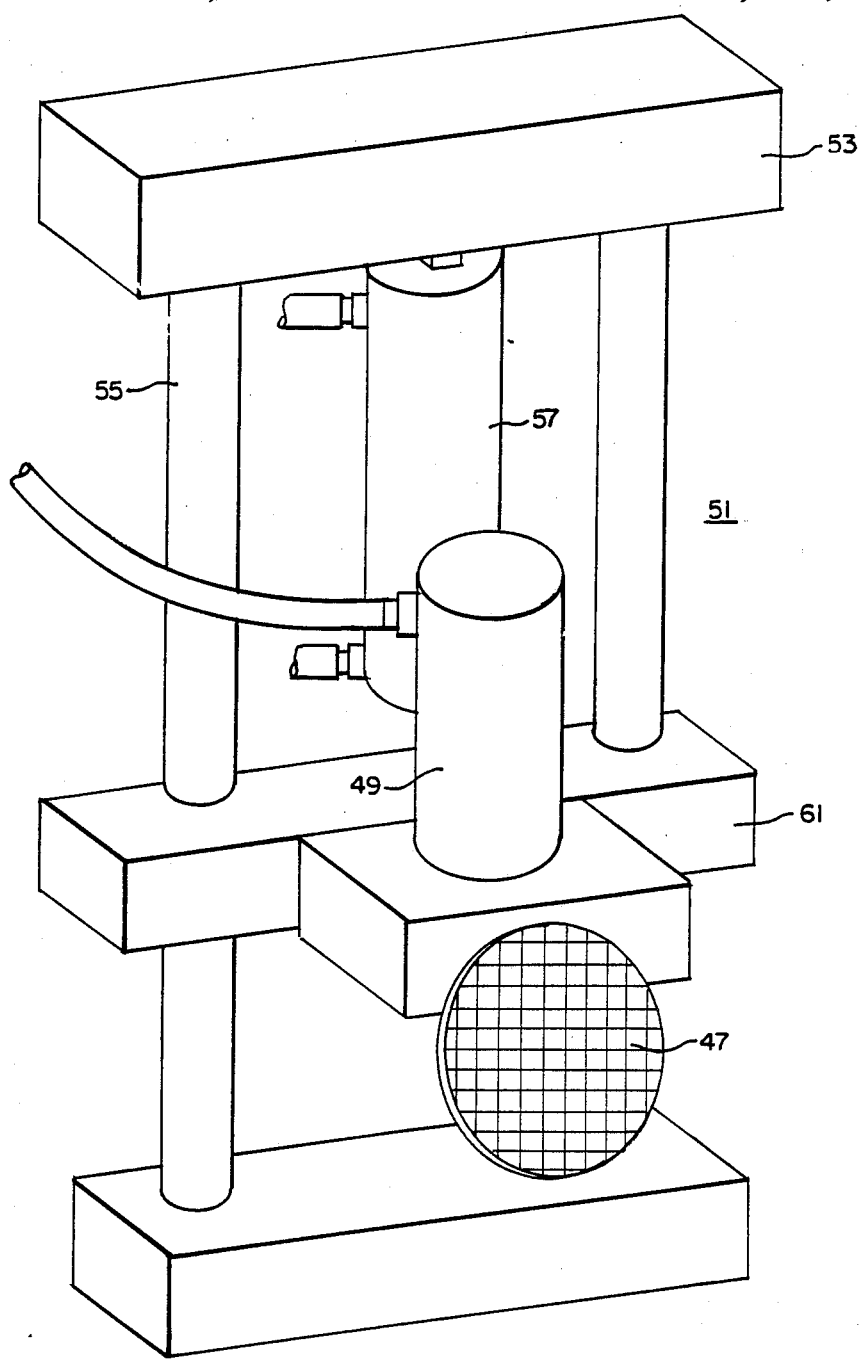
FIG. 6 is a diagrammatic view in isometric showing the severing means including the grinder and its actuating mechanism.

Within the enclosure 37, there is also a rotary grinder 47 which is composed of electrically insulating material. The grinder 47 is driven by an air motor 49 (FIGS. 4, 5, 6). As shown in FIG. 5, the air flowing into motor 47 is exhausted through the motor. The unit including the grinder 47 and air motor 49 is movable vertically upwardly and downwardly by an air-cylinder assembly 51. This assembly 51 (FIG. 6) includes a top fixed mounting block 53 from which guide bars 55 extend and an air cylinder 57 is suspended. The piston rod 59 (FIG. 5) of the air cylinder 57 carries a mounting block 61 from which the unit including the air motor 49 and the grinder 47 driven by it is supported. This mounting block 61 is composed of electrically insulating material, typically "NYLON", and is slideable along the guide bars 55 upwardly and downwardly by the piston rod 59. The air supply is connected to the cylinder 51 through the air control valve 45 and through speed control valves 63.

In the practice of this invention for each weld, the arm 21, responsive to the sensing means 35 and under the control of computer 15, sets the tip of wire 39 precisely at the joint 29. The welding seam is produced. Then as commanded by the computer 15, the arm 21 carries the unit including the wire 19, the torch 23 and the spool 27 to the severing means and inserts the torch into the severing means through the opening 39 setting the end 18 of the wire 19 in position to be severed. The proximity switch 41 is triggered setting the air control solonoid valve in the operative setting. The air motor 49 is enabled to rotate the grinder 47 at a high speed and at the same time the piston 59 moves the unit including the air motor and the grinder downwardly to sweep the grinder through the wire to sever the oxidized tip. The wire 19 is positioned horizontally to be severed and the grinder moves substantially vertically. A sharp cut is thus produced leaving the new end of the wire 19 linear. The severing operation typically consumes about 15 seconds. Then the arm 21 returns the wire, torch and spool to the work W for a succeeding operation.

While an embodiment of this invention has been disclosed herein, many modifications thereof are feasible. This invention is not to be restricted except insofar as is necessitated by the spirit of the prior art.

I claim:

1. Welding apparatus for producing a series of filler welds in work with a filler welding wire, the tip of said wire being oxidized during each weld of said series, the said apparatus including: means for continuously supplying said welding wire, means, spaced from said work when actuated for severing said wire, said severing means including triggering means, means, connected to said wire-supplying means, automatically actuable, to bring said wire into welding relationship with said work at intervals to produce each weld of said series and, during each interval between said each weld and a weld succeeding said each weld and after said each weld has been produced, to position said wire in said severing means, said triggering means being triggered by said positioning of said wire in said severing means, and means, connected to said triggering means, actuable by said triggering of said triggering means, to actuate said severing means to sever said wire near its oxidized tip.

2. Apparatus for producing a series of filler welds in work with a welding filler wire, the tip of said wire being oxidized during each weld, the said apparatus including: a robot having a movable arm, means, on said arm for continuously supplying a welding wire, a welding torch through which the proximal end of said wire is threaded, said torch including means actuable to advance said wire into welding relationship with said work, wire-severing means spaced from said work, said wire-severing means including means actuable to sever said wire and triggering means, and means, connected to said robot, for repeatedly actuating said arm to move from a first setting in which said torch is positioned so that said wire is in welding relationship with said work for producing each weld of said series of welds and a second setting in which said arm positions said torch with said oxidized end of said wire in said severing means, and means, reactive with said triggering means, responsive to the positioning of said torch with said wire in said severing means, for actuating said severing means to sever said wire near its oxidized end.

3. The method of producing a series of filler welds in work with a welding filler wire whose tip is oxidized by each weld and with wire-severing means including triggering means, the said method comprising: with said wire-severing means in fixed position automatically moving said welding wire back and forth repeatedly after each of said series of welds between a first position in which said wire is in welding relationship with said work and a second position in which said wire is positioned in said wire-severing means in position to be severed near its oxidized end, with the wire in said first position producing a welding arc between said wire and said work to produce each of said series of welds, and with said wire in said second position triggering said triggering means responsive to the positioning of said wire in said wire-severing means to trigger said severing means to sever said wire near said oxidized end.

4. In producing a series of filler welds in work with a welding filler wire using a robot having an arm for manipulating the wire, said robot including sensing means responsive to electrical conduction through the wire and the work for locating said wire in the correct position for welding, the end of said wire being oxidized during each weld of the series which would undesirably preclude said electrical conduction for the next weld of the series; apparatus for conditioning the wire for sensing after each of said series of welds including: wire-severing means spaced from said work, said wire-severing means including triggering means, said robot positioning said wire after each weld in said severing means in position to be severed near the oxidized end thereof, and means, responsive to the positioning of said wire in said severing means, to trigger said triggering means, to trigger said severing means to sever said oxidized end of said wire.

5. The apparatus of claim 4 wherein the severing means includes a high speed grinder, means, connected to said grinder, for driving said grinder, means, connected to said grinder, for moving said grinder from a standby position into cutting relationship with the wire, and means, connecting said driving means and said moving means to the actuating means, to be actuated on the triggering of said severing means responsive to the positioning of the wire in the severing means to sever said wire near the oxidized end thereof.

6. The apparatus of claim 5 wherein the moving means moves the grinder as it is rotated in cutting relationship with the wire with the cutting edge of the grinder moving substantially at right angles to the wire so that the wire after the end is severed from it remains substantially linear at its new end.

7. In producing in succession a series of filler welds in work with a welding filler wire using a robot having an arm for manipulating the wire, said robot including sensing means responsive to electrical conduction through the wire and the work for locating said wire in the correct position for welding, the end of said wire being oxidized during each weld of the series which would undesirably preclude said electrical conduction for positioning the wire for the next weld of the series; the method of severing said wire near its oxidzed end to condition the remainder of said wire for said sensing, the said method being practiced with a high-speed rotary grinder; the said method comprising: setting the wire with its oxidized end in position to be severed generally perpendicular to the cutting edge of said grinder, and with the wire extending linearly to its oxidized end, directly responsive to such setting of said wire, triggering, the advancing of said grinder through said oxidized end, while said cutting member is rotating substantially at right angles to said wire to cut off the oxidized end while the remaining wire in the region where it is cut remains substantially linear.

8. In the welding of work with a welding filler wire by a series of welds using a robot having an arm for manipulating the wire, said robot including sensing means responsive to electrical conduction through the wire and the work for locating said wire in the correct position for welding, the end of said wire being oxidized during each weld of the series which would undesirably preclude electrical conduction for the succeeding weld of the series; the method of conditioning said wire for sensing following the completion of each weld of said series, said method being practiced with wire-severing means displaced from said work including triggering means and comprising: after each weld of the series positioning said wire in wire-severing means, reacting said wire when so positioned with said triggering means automatically triggering said severing means when so triggered to sever said wire near said oxidized end, and thereafter automatically positioning said wire in sensing relationship with said work and producing the weld succeeding said each weld.

9. Apparatus for producing a series of filler welds in work with a welding filler wire, the tip of said wire being oxidized during each weld, the said apparatus including: a robot having a movable arm, means, on said arm, for continuously supplying a welding wire, a welding torch through which the proximal end of said wire is threaded, said torch including means actuable to advance said wire into welding relationship with said work, wire-severing means spaced from said work, said wire-severing means including means actuable to sever said wire, and means, connected to said robot, for repeatedly actuating said movable arm to move from a first setting in which said torch is positioned so that said wire is in welding relationship with said work for producing each weld of said series of welds and a second setting in which said arm positions said torch with said oxidized end of said wire in said severing means, and means, responsive to the positioning of said torch with said wire in said severing means, for actuating said severing means to sever said wire near its oxidized end, said actuating means for said severing means including a proximity switch, said proximity switch having a standby setting and an enabling setting in which said proximity switch enables said actuating means for said severing means to actuate said severing means, said proximity switch being triggered by the proximity of said torch, when said torch is positioned with said oxidized end of said wire in said severing means, from said standby setting to said enabling setting to enable said actuating means for said severing means to actuate said severing means to sever said wire near said oxidized end.

10. The apparatus of claim 9 wherein the means actuable to sever the wire includes a grinder composed of electrically insulating material and mounting means for the grinder also composed of electrically insulating material.

11. In producing a series of filler welds in work with a welding filler wire using a robot having an arm for manipulating the wire, said robot including sensing means, responsive to electrical conduction through the wire and the work, for locating said wire in the correct position for welding, the end of said wire being oxidized during each weld of the series which would undesirably preclude said electrical conduction for the next weld of the series; apparatus for conditioning the wire for sensing after each weld of said series of welds, the said apparatus including: wire-severing means to be spaced from said work, said robot positioning said wire after each weld in said severing means in position to be severed near the oxidized end thereof, and means, responsive to the positioning of said wire in said severing means, for actuating said severing means to sever said oxidized end of said wire, said responsive means including a proximity switch, responsive to the positioning of said wire in the severing means for enabling said actuation of said severing means.

12. The apparatus of claim 11 wherein the severing means includes a grinder of electrically insulating material and mounting means for the grinder also composed of electrically insulating material.

13. Apparatus for producing a series of filler welds in work with a welding filler wire, the tip of said wire being oxidized during each weld, the said apparatus including: a robot having a movable arm, means, on said arm, for continuously supplying a welding wire, a welding torch through which the proximal end of said wire is threaded, said torch including means actuable to advance said wire into welding relationship with said work, wire-severing means spaced from said work, said wire-severing means including means actuable to sever said wire, and means, connected to said robot, for repeatedly actuating said movable arm to move from a first setting in which said torch is positioned so that said wire is in welding relationship with said work for producing each weld of said series of welds and a second setting in which said arm positions said torch with said oxidized end of said wire in said severing means, and means, responsive to the positioning of said torch with said wire in said severing means, for actuating said severing means to sever said wire near its oxidized end, said means actuable to sever said wire including a grinder composed of electrically insulating material and mounting means for said grinder also composed of electrically insulating material whereby the disabling of robot during the severing of the oxidized end of wire by the short circuiting is precluded.

14. In producing a series of filler welds in work with a welding filler wire using a robot having an arm for manipulating the wire, said robot including sensing means, responsive to electrical conduction through the wire and the work, for locating said wire in the correct position for welding, the end of said wire being oxidized during each weld of the series which would undesirably preclude said electrical conduction for the next weld of the series; apparatus for conditioning the wire for sensing after each weld of said series of welds, the said apparatus including wire-severing means to be spaced from said work, said robot positioning said wire after each weld in said severing means in position to be severed near the oxidized end thereof, and means, responsive to the positioning of said wire in said severing means, for actuating said severing means to sever said oxidized end of said wire, said severing means including a grinder composed of electrically insulating material and mounting means for said grinder composed of electrically insulating material whereby the disabling of said robot during the severing of the oxidized end of said wire by short circuiting is precluded.

* * * * *